United States Patent Office 3,645,940
Patented Feb. 29, 1972

3,645,940
POLYSACCHARIDE-REINFORCED RUBBER
Howard L. Stephens, Akron, and Thomas F. Reed, Cuyahoga Falls, Ohio, assignors to the United States of America as represented by the Secretary of Agriculture
No Drawing. Filed Sept. 18, 1969, Ser. No. 859,195
Int. Cl. C08d 9/06; C08c 9/12
U.S. Cl. 260—17.4 BB                                        11 Claims

ABSTRACT OF THE DISCLOSURE

Moist polysaccharide-rubber coprecipitates are subjected to vigorous hot mechanical working during the critical phase inversion from rubber particles in a polysaccharide matrix to polysaccharide particles in a rubber matrix. This yields masterbatches which have better dispersion of polysaccharide in rubber than has been previously attained, and which provide vulcanizates having greatly improved strengths and elastic properties.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates to and has among its objects the provision of polysaccharide-rubber compositions which exhibit new and improved properties. The objects of the invention also include the provision of novel processes for preparing these compositions. A particular aspect of the invention concerns extensions of, and improvements over, the inventions described in U.S. Pat. 3,442,832, May 6, 1969, and in copending application Ser. No. 701,843, filed Jan. 31, 1968, now U.S. Pat. 3,480,572 both of Buchanan et al., which disclosures are incorporated herein by reference.

In the aforesaid patent and copending application (3,442,832 and 701,843, respectively) it is disclosed that reinforced rubbers are obtained by coprecipitation of a polysaccharide and a rubber latex followed by drying, milling, and vulcanization of the coprecipitate.

We have now found that the reinforcement of rubber with polysaccharides is greatly improved when the moist polysaccharide-rubber coprecipitate is subjected to progresive stepwise vigorous hot mechanical working during the critical processing step wherein phase inversion occurs (from rubber particles in a polysaccharide matrix to polysaccharide particles in a rubber matrix). Such mechanical working leads to large improvements in both elastic and strength properties of vulcanizates made from the resulting masterbatches. Our studies indicate that these improvements result from smaller and more uniform particle size and better dispersion of the polysaccharide in rubber than was previously obtained. The reduction in polysaccharide particle size and improved polysaccharide dispersion result from a temperature-dependent moisture plasticization of the polysaccharide to the degree required for attrition and distribution by mastication in rubber. This attrition and distribution must be accomplished concurrently with the inversion of phase which occurs as a critical step in all known methods for making starch reinforced rubber.

Certain aspects in the practice of this invention are similar to conventional extrusion drying as practiced industrially, particularly in manufacture of rubbers with low ash contents for use in electrical applications, but this prior art does not teach or suggest that such drying would improve strength and elastic properties of vulcanizates. Similarly, drying of wet rubber crumb has been accomplished simultaneously with carbon black and oil incorporation by hot mastication in a Banbury mixer as disclosed by Beber et al., U.S. Pat. 3,294,720. This patent claims relatively slight improvements in crack and abrasion resistances; however, data cited in its examples show that changes in tensile properties, hardness, tear strength, and rebound were insignificant. Thus, this patent also teaches that hot mechanical working of moist rubber crumb does not improve general physical properties and especially does not improve the elastic properties of resulting rubber vulcanizates. Furthermore, organic reinforcing agents are unlike carbon black in that mechanical shear is observed to destroy almost all the reinforcing effect of various resins in rubber (Jean Le Bras, "Rubber Reviews for 1962," in Rubber Chemistry and Technology 35, 1329 (1962)). Hence, the whole prior art teaches that hot mechanical working should either be ineffective or deleterious in improving the reinforcement of rubber with polysaccharides.

However, we have accidentally discovered that contrary to prior art, large increases in vulcanizate tensile strength, ultimate elongation, tear strength, and resilience result from subjecting polysaccharide-rubber coprecipitates to hot mechanical working under specified conditions. Rubber hardness is reduced and no stress whitening occurs even at ultimate elongation. To obtain these improvements, the coprecipitate while moist is subjected to progressive stepwise hot mechanical working, at least part of the mechanical working being applied in a closed system (as in the compression side of a conventional extruder) in order to retain moisture and so attain a desired moisture-plasticization of the polysaccharide. During the mechanical working steps the material is maintained at a temperature of about 110°–150° C. The working may be carried out in a series of separate extruders (preferably, at least three units) arranged in line, or in a single multiple section extruder with at least three sections and provision for reduction of pressure and venting between sections. In the alternative, the coprecipitate may be initially subjected to milling on conventional hot rolls before it is subjected to one or more extrusions. In fact, an initial milling step is the treatment of choice so that if the coprecipitate is directly fed into an extrusion device, it should be one of the type which provides a milling or mastication section in an open system before the mass is forced into the closed chamber which provides the entrance to the extrusion orifice. We have found that particularly good results are attained when the initial working in the open (applied by hot rolls or by the initial mastication in the forechamber of an extruder) is continued until the moisture content of the coprecipitate is reduced to about 25% and the material is at least beginning to knit together to form a coherent plastic mass. The temperature of the material during such initial treatment is maintained at about 110–150° C.

Our invention may be practiced with any of the polysaccharide rubber compositions disclosed by Buchanan et al. in Pat. 3,442,832 and application Ser. No. 701,843, now Pat. No. 3,480,572. Accordingly, as the rubber, we employ natural rubber or synthetic elastomers such as nitrile or SBR rubbers. As the polysaccharide, we employ starch or starch derivatives prepared either from refined starches or cruder amylaceous materials such as corn or wheat flours. Examples of applicable starch derivatives are gelatinized starches, gelatinized flours, aminated starches and flours, xanthated flours and starches, resin-treated flours and starches, starch and flour xanthides, etc.

Among the advantages of the invention is the provision of highly elastic, highly reinforced rubbers differing in kind from previously described much less elastic and less reinforced products. These new rubbers are "softer" (lower in hardness and modulus) "stretchier," (higher in ultimate elongation), and "bouncier" (higher in rebound resilience), as well as stronger than the previously described starch-reinforced rubbers. Also, they do not show undesirable "stress whitening" as do prior art highly loaded starch-reinforced rubbers and conventional inorganic pigment-filled rubbers.

Another advantage of the invention is the provision of polysaccharide-reinforced rubbers having greatly improved technical properties, particularly the "rubbery" or elastic properties. Prior art starch-reinforced elastomers showed rapid loss of strength and particularly elastic properties with increasing starch loading above the range of 25 to 45 phr. where maximum strength occurred. Prior art rubbers containing 70 to 100 phr. starch were poor in elasticity, hard, and with low ultimate elongations. In contrast, polysaccharide-reinforced rubbers prepared by the method of the instant invention show a strength maximum at loading of 50 phr. or greater, and are very rubbery up to at least 100 phr., much softer and stretchier than prior art products.

Another advantage of the invention is to provide a method for greatly improving the effectiveness of starch derivatives as a rubber reinforcing agent without using relatively expensive resorcinol and formaldehyde or other resole additives.

EXAMPLES

The invention is further demonstrated by the following illustrative examples.

Some of the experiments—i.e., Samples A, B, C, D, G, I, and J—are not in accordance with the invention; they are included for purpose of comparison.

EXAMPLE 1

The starting materials were: Rubber latex, type 1500 SBR (styrene-butadiene), containing 20.4% total solids, and an aqueous solution of starch xanthate with a starch content of 10% and a xanthate degree of substitution (D.S.) of 0.08.

A homogeneous mixture of 25.84 kg. latex and 25.33 kg. starch xanthate solution was prepared. Then 82.5 g. of sodium nitrite was added and the mixture agitated during slow addition of M sulfuric acid to reduce the pH to 3.5. This treatment coprecipitated starch xanthide and SBR elastomer as large curd particles. Serum pH increased to about 5 during coprecipitation. The curds were recovered by filtering on No. 90 straining cloth, then washed by resuspension in distilled water and again recovered by filtration. The wet coprecipitate contained about 39% solids and 50 phr. (weight parts per 100 parts elastomer) starch. This wet coprecipitate was divided into several portions, each being separately treated as described below.

Sample A.—Vacuum oven drying

A 2.1-kg. portion of the wet coprecipitate was dried for 36 hours in vacuum (27 in. of mercury) at 50° C. The dry sample weighed 832 g. and had 3.3% total volatiles. Its particles were hard, horny, and nontacky showing that phase inversion had not occurred; starch was the continuous phase.

Sample B.—Forced-draft oven drying

A 2.1-kg. portion of the wet coprecipitate was dried for 24 hours in a forced draft oven at 70° C. The product weighed 827 g. and contained 3.1% total volatiles. Its properties were identical to those of Sample A.

Sample C.—Hot dry extrusion

A 300-g. portion of dry Sample B was extruded, then recycled two more times through a hot extruder. Its temperature was about 150° C. as it came from the die each cycle. The final product weighed 288 g. and contained 2.4% total volatiles. It was a rubbery material, thus the phase reversal (to starch particles in a rubber matrix) had been accomplished.

The extruder for Sample C and other samples in Example 1 was an extrusion attachment used with the Brabender Plasticorder laboratory instrument. This extruder has a 20:1 length to diameter ratio, a 3:1 compression ratio, and two electrically heated barrel zones. The feed zone of the barrel was set at 125° C., and the zone at the die end was set at 150° C. The die had seven 0.040-in. holes and was not heated independently.

Sample D.—Hot milling

Nine hundred grams of wet coprecitate was dried by passing through a heated rubber mill repeatedly. This was a laboratory differential roll mill with a front roll speed of 24 feet/minute and a rear roll to front roll speed ratio of 1.4:1. The rolls were steam heated to 112° C. as measured by exit steam temperature, and the nip opening was adjusted to 0.010 in.

After five passes, the sample weighed 460 g. and had a moisture content of about 24%. The sample did not begin to knit together until the sixth pass, thus no phase inversion had occurred up to this point. In subsequent passes, phase inversion occurred along with further drying. After 20 passes, the final product weighed 354 g. and contained 3.0% total volatiles.

Sample E.—Hot wet extrusion

A 900-g. sample of wet coprecipitate was partially dried by passing it seven times through the heated rubber mill described above and using the same temperature, 112° C., and nip opening, 0.010 in. On the seventh pass the material had just begun to knit together, but the continuous phase remained substantially starch. At this stage the material weighed 464 g. and had a moisture content of about 25%.

The partially dried material was then extruded for four cycles at 150° C. in the extruder described for Sample C. At the initial extrusion, steam flashed off, the extrudate puffed, moisture content was reduced to 16%, and at least partial phase inversion occurred. On the second extrusion, additional steam puffing occurred and moisture content was reduced to 7.8%. After the third extrusion, moisture content was 4.3% and phase inversion was complete. Another extrusion cycle gave 353 g. of completely dry sample containing 3.6% total volatiles. This product, unlike Samples A through D, was transparent when formed into a sheet by cold pressing.

Sample F.—Soaked dry crumb, hot wet extrusion

A 273-g. portion of Sample A was immersed in distilled water for 65 hours at room temperature. In this soaking the crumbs absorbed 43% water. The re-moistened crumb was then partially dried without undergoing phase reversal by four passes through the above-described heated (112° C.) rubber mill.

The partially-dried material (25% moisture content) was then hot extruded as described above in connection with Sample E. The same results were achieved during extrusions as with Sample E. The product had a weight of 265 g., it contained 4.1% total voaltiles, and it also gave transparent sheets by cold pressing.

Each of the above samples was compounded on a laboratory mill essentially as described by ASTM D15-64T. However, it was necessary to give Samples A and B a preliminary milling of about six minutes duration to reverse the phases before compounding, thus these two samples are simply representative prior art starch reinforced masterbatches. The compounding recipe was based on Recipe 2B of the ASTM procedure. For each 150 phr. of sample there was incorporated 5.0 phr. zinc oxide, 2.0 phr. sulfur, 3.0 phr. benzothiazyl disulfide, 1.5 phr. stearic acid, and 1.2 phr. alkyl aryl phenol antioxidant. Each compound was press cured 15 minutes at 145° C. to give 3 in x 4 in. x 0.030 in. vulcanized sheets.

The cured specimens were examined for appearance and microscopic starch dispersion. The visual appearance was rated on a scale of 0 to 5 for from no evidence of poor starch dispersion up to splotchiness indicating poor dispersion, respectively. Microscopic starch dispersion was determined by the well-known Cabot Company Dispersion Classification Method described in their Technical report RG–124 by A. I. Medalia and D. F. Walker. This system uses numbers 1 through 6 to indicate microscopic agglomerate frequency from very few to many, respectively, and letters A through H to indicate microscopic size from nonresolvable to relatively large, respectively. The results are tabulated as follows:

| Sample number and treatment | Appearance rating | Cabot microscopic dispersion classification |
|---|---|---|
| (A) Vacuum oven drying | 5 | 6H |
| (B) Forced draft oven drying | 5 | 3E |
| (C) Hot dry extrusion | 2 | 2B |
| (D) Hot milling | 0 | 2E |
| (E) Hot wet extrusion | 0 | 1A |
| (F) Soaked dry crumb, hot wet extrusion | 0 | 1A |

The cured specimens were also assayed for elastic properties, strength, and stress whitening, using standard test methods.

The elastic properties of each sample are tabulated below:

| Sample number and treatment | Hardness, Shore A | 300% modulus, p.s.i. | Ultimate elongation, percent | Rebound, resilience percent |
|---|---|---|---|---|
| (A) Vacuum oven drying | 90 | 1,320 | 150 | 30 |
| (B) Forced draft oven drying | 85 | 1,330 | 180 | 28 |
| (C) Hot dry extrusion | 71 | 1,340 | 420 | 35 |
| (D) Hot milling | 83 | 1,070 | 200 | 33 |
| (E) Hot wet extrusion | 55 | 1,040 | 650 | 43 |
| (F) Soaked dry crumb, hot wet extrusion | 49 | 670 | 750 | 41 |

The strength of each sample was as follows:

| Sample number and treatment | Tensile strength, lb./in.$^2$ | Stress whitening |
|---|---|---|
| (A) Vacuum oven drying | 1,320 | Severe. |
| (B) Forced draft oven drying | 1,330 | Do. |
| (C) Hot dry extrusion | 1,670 | Do. |
| (D) Hot milling | 1,070 | Do. |
| (E) Hot wet extrusion | 2,090 | None. |
| (F) Soaked dry crumb, hot wet extrusion | 2,310 | Do. |

It is evident from the foregoing tables that Samples E and F which were treated in accordance with the invention exhibit properties far superior in every respect to those of the other rubbers. Moreover, the strength properties of Samples E and F are essentially equal to those of the resole-treated starch xanthate reinforced rubbers described in Ser. No. 701,843, now U.S. Pat. 3,480,572 but their "rubbery" properties are far superior.

EXAMPLE 2

Sample G.—Conventional extrusion drying

An attempt was made to accomplish the desired objectives by dewatering and drying a portion of the wet coprecipitate (prepared as in Example 1), using a laboratory machine exactly duplicating industrial extrusion dryers used for wet crumb SBR coagulum. The machine consisted of a dewatering tapered (3½ in. to 1½ in.) extruder with a screened feed hopper and a heated straight section extruding onto a fluidized bed hot-air dryer.

This machine was completely unsatisfactory; it was unable to mechanically expel water from starch-rubber masterbatch, would not self feed, and forced material into the feeder screen clogging it. When force fed by "hand-ramming," it was unable to reduce moisture content to a suitable level for the mechanical working in the hot extruder section and did not bring about phase inversion. Thus there was no product for Sample G and this experiment demonstrated that extrusion drying as conventionally done with usual industrial equipment is inoperative toward polysaccharide-rubber coprecipitate and does not accomplish the objects of the present invention.

Sample H.—Multiple section extrusion drying

In this case, a portion of the wet coprecipitate (prepared as in Example 1) was processed in a multiple section extrusion machine especially designed to duplicate the treatment of Sample E, Example 1.

At the feed end this machine was equipped with a vented twin screw arrangement which exerted a milling effect while allowing free release of steam. Following this portion of the device was a series of three extruding sections, each equipped with a vent for release of steam as the extrudate emerged from the preceding orifice. The device was electrically heated at 150° C. with the exception of the final orifice which was held at 120° C. Due to heat generated in the extrusion, however, the extrudate emerged at 150° C.

The machine operated well on the wet coprecipitate. It gave a thoroughly dry product which was transparent when cold pressed to a thin sheet.

A sample of the processed material was compounded and cured as described in Example 1. Its physical properties are compared with those of Sample A in the following table:

| | Sample A[a] | Sample H[b] |
|---|---|---|
| Appearance rating | 5 | 1 |
| Hardness, shore A | 90 | 63 |
| Ultimate elongation, percent | 150 | 300 |
| Rebound resilience, percent | 30 | 39 |
| Tensile strength, lbs./in.$^2$ | 1,320 | 1,980 |
| Stress whitening | Severe | Very slight |

[a] Not according to invention.
[b] In accordance with invention.

Although Sample H was somewhat less "rubbery" than Samples E and F, the above table shows that it displayed a marked improvement over the prior art material represented by Sample A.

EXAMPLE 3

Two wet starch xanthide-SBR coprecipitates were prepared by the method of Example 1, but with the amount of starch xanthide increased to give 72 phr. and 100 phr. starch, respectively.

Each of these coprecipitates was divided into two portions. One portion of each was dried in a forced draft oven and milled by the prior art method described above for Sample B. The resulting products were designated as Samples I and J for the 72 phr. and 100 phr. starch masterbatches, respectively. The other portions—designated as Samples K and L, respectively—were processed as described above for Sample E, that is, by the procedure of the invention.

Each sample of processed material was compounded and cured as described in Example 1. Their properties are tabulated below:

| Property | 72 phr. starch | | 100 phr. starch | |
|---|---|---|---|---|
| | I[a] | K[b] | J[a] | L[b] |
| Appearance rating | 5 | 0 | 5 | 0. |
| Hardness, shore A | 95 | 81 | 94 | 72. |
| Ultimate elongation, percent | 20 | 200 | 20 | 290. |
| Rebound resilience, percent | 28 | 33 | 30 | 34. |
| Tensile strength, lb./in.$^2$ | 1,330 | 1,730 | 1,020 | 820. |
| Tear strength, lb./in | 118 | 181 | 119 | 178. |
| Stress whitening | Severe | None | Severe | Very slight. |

[a] Prior art.
[b] In accordance with invention.

We claim:

1. A process for preparing a polysaccharide-reinforced rubber masterbatch having improved properties from a wet coprecipitate comprised of a rubber of the group consisting of natural rubber, nitrile rubber, and SBR rubber and a polysaccharide of the group consisting of starch and starch derivatives, said process comprising the steps of:
   (a) subjecting the wet coprecipitate to vigorous milling action in an open system at a temperature of about 110–150° C. until the moisture content of the mass is reduced to about 25 percent, then
   (b) subjecting the mass to further vigorous mechanical working while it is heated to a temperature of about 110–150° C.
   (c) said vigorous mechanical working being continued until phase inversion occurs to yield a product of polysaccharide particles uniformly dispersed in a rubber matrix, and until the total moisture content of the product is less than 8 percent, and
   (d) wherein said vigorous mechanical working includes at least one extrusion operation in which the material, heated to about 150° C., is worked while compressed under superatmospheric pressure in a closed chamber.

2. The process of claim 1 wherein the rubber is SBR rubber.

3. The process of claim 1 wherein the polysaccharide is starch xanthide.

4. The process of claim 1 wherein the rubber is SBR rubber and the polysaccharide is starch xanthide.

5. The process of claim 4 wherein the starch xanthide is present in about 50 phr.

6. The process of claim 4 wherein the starch xanthide is present in about 70 phr.

7. The process of claim 4 wherein the starch xanthide is present in about 100 phr.

8. The product produced by the process of claim 1.

9. The product produced by the process of claim 4.

10. The vulcanized product of claim 8.

11. The vulcanized product of claim 9.

References Cited

UNITED STATES PATENTS

| | | | |
|---|---|---|---|
| 3,062,762 | 11/1962 | Rice et al. | 260—17 |
| 3,290,268 | 12/1966 | Scofield | 260—41.5 |
| 3,294,720 | 12/1966 | Beber et al. | 260—23.7 |
| 3,400,096 | 9/1968 | Bateman et al. | 260—33.6 |
| 3,442,832 | 5/1969 | Buchanan et al. | 260—17.4 |

MELVIN GOLDSTEIN, Primary Examiner

U.S. Cl. X.R.

260—749